Patented Oct. 8, 1940

2,216,753

UNITED STATES PATENT OFFICE 2,216,753

TREATMENT OF SUGAR SOLUTIONS

Pedro Sanchez, Habana, Cuba, and Eugene N. Ehrhart, New York, N. Y., assignors to Sucro-Blanc, Inc., New York, N. Y.

No Drawing. Application August 27, 1938, Serial No. 227,209

4 Claims. (Cl. 127—48)

The present invention relates to the decolorization of sugar solutions and more particularly to the elimination of color from such solutions by the use of active chlorine.

Heretofore, in Patent No. 1,989,156 issued on January 29, 1935, to one of us, it has been proposed to decolorize certain types of sugar solutions by treating the sugar solution with an amount of active chlorine, such as a soluble hypochlorite, sufficient to remove substantially all of the coloring matter from the solution, producing a solution suitable for use per se or as a medium from which white crystal sugar could be grained.

In the procedure described in the above enumerated patent, a sugar solution is prepared at room temperature, that is to say, of below about 35° C., and treated with sufficient hypochlorite and material reacting therewith to precipitate substantially all the ash-forming ingredients added to the solution, agitated and passed to tanks to permit defecation and color removal to occur. After about two hours a precipitate of tricalcium phosphate, together with certain impurities in the sugar solution, rises to the top and the clear liquor separated from the scum, hydrogen peroxide added thereto as a dechlorinator and after filtration white crystal sugar boiled therefrom.

In the production of clear, sparkling and substantially decolorized sugar solutions by the employment of active chlorine as the color eliminating agent, certain materials are produced in the sugar solution, probably additive chlorine compounds, which darken in color upon standing or upon application of heat to the solution.

It is the object of the present invention to substantially eliminate the tendency of hypochlorite treated sugar solutions to acquire color upon standing or upon heating.

It is a further object of the present invention to produce from a sugar solution of a given color a resultant decolorized solution by the employment of substantially less active chlorine than has been thought necessary heretofore in practicing the invention of Patent No. 1,989,156.

In accordance with the procedure of the present invention the sugar to be decolorized, if solid, is dissolved in water at room temperature, that is to say, temperatures below about 35° C., and a quantity of hypochlorite and monocalcium phosphate added thereto sufficient in quantity to substantially decolorize the solution. The sugar solution, generally one of high Brix, is agitated and then heated to a temperature of about 175° F.

The solution is allowed to stand in the heated condition until a scum forms on the top of the solution permitting the clear liquor to be readily separated therefrom. Due to the fact that the solution has been heated, whatever color is formed by the additive chlorine compound is already imparted to the solution. It has been found heretofore that this color is difficult of elimination and in accordance with the procedure of the present invention the solution that has already been treated wtih hypochlorite and heated or permitted to stand until it has acquired color, is then treated with a small additional quantity of hypochlorite and agitated. By this procedure substantially all traces of color are removed and a syrup produced that is practically colorless and that may be used, after a check filtration, as a sugar syrup or as a sugar liquor from which white crystal sugar may be grained.

It will be understood that in referring to the hypochlorite, any suitable hypochlorite may be employed as for instance calcium hypochlorite, magnesium hypochlorite, and the like although for practical operating reasons calcium hypochlorite will be preferred. It will be also understood that the monocalcium phosphate, added to the solution for the purpose of eliminating all ash-forming materials added thereto, may be substituted by other acids or acid salts, or both, capable of reacting with the metallic ion of the hypochlorite to produce an insoluble precipitate. However, it has been found that the calcium hypochlorite and monocalcium phosphate are eminently suited for the purpose and are preferred in practicing the invention.

As an example, purely illustrative of the invention but not limitative thereof, a solution of raw washed sugar of 60 Brix having a color of 12 units on the Horne scale was treated at 30° C. with 0.18% combined hypochlorite and monocalcium phosphate, stirred for about fifteen minutes, permitted to stand and the scum separated from the solution. The color of the solution was 0.7 unit on the Horne scale. Upon heating the solution preparatory to graining, the color darkened perceptibly to 2.2.

A portion of the same initial solution was treated at room temperature with 0.13% combined hypochlorite and monocalcium phosphate, stirred for about fifteen minutes, permitted to stand and the scum separated from the solution. The color of the treated solution was 1.1. This solution was heated to 170° F., an additional 0.03% hypochlorite was added to the hot solution. The color of this solution was 0.9 unit of color on the Horne scale. The color of the solution preparatory to graining was found to be 1.0.

From the above it will be seen that the present invention provides a method of decolorizing sugar solutions more efficiently than heretofore by employment of hypochlorite as the decolorizing agent with the production of solutions of greater stability as to color.

What is claimed is:

1. The method of decolorizing sugar solutions with active chlorine which comprises treating the solution with a quantity of hypochlorite sufficient to remove a substantial portion of color from the solution and a quantity of acid or acid salt sufficient to remove substantially all the ash-forming ingredients added to the solution, and thereafter heating the solution to induce color return therein, separating the insoluble material from the solution, and then treating the solution with hypochlorite sufficient in amount to remove the color formed upon heating.

2. The method of decolorizing sugar solutions with active chlorine which comprises treating the solution with a quantity of hypochlorite sufficient to remove a substantial portion of color from the solution and a quantity of a soluble material containing the phosphate radical sufficient to remove substantially all the ash-forming ingredients added to the solution, and thereafter heating the solution to induce color return therein, separating the insoluble material from the solution, and then treating the solution with hypochlorite sufficient in amount to remove the color formed upon heating.

3. The method of decolorizing sugar solutions with active chlorine which comprises treating the solution with a quantity of calcium hypochlorite sufficient to remove a substantial portion of color from the solution and a quantity of monocalcium phosphate sufficient to remove substantially all the calcium as calcium phosphate, heating the solution to a temperature sufficient to induce color return therein, separating the calcium phosphate and any scum adhering thereto from the solution, and then eliminating color from the so separated solution by treatment with additional hypochlorite.

4. The method of decolorizing sugar solutions with active chlorine which comprises treating the solution with a soluble phosphate and a quantity of hypochlorite sufficient to produce a predetermined decolorization of the solution, thereafter heating the solution to an elevated temperature whereby scum and color form in the solution, separating the scum from the colored solution, and then treating the solution with an amount of hypochlorite sufficient to produce substantially the same color obtained after the first hypochlorite treatment.

PEDRO SANCHEZ.
EUGENE N. EHRHART.